United States Patent
Fert et al.

(10) Patent No.: US 10,287,984 B2
(45) Date of Patent: May 14, 2019

(54) TURBINE ENGINE PROVIDED WITH MEANS FOR ABSORBING STRESSES FROM THE THRUST OF THE ENGINE THEREOF

(71) Applicant: SNECMA, Paris (FR)

(72) Inventors: Jérémy Edmond Fert, Paris (FR); Carmen Gina Ancuta, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 355 days.

(21) Appl. No.: 15/034,509

(22) PCT Filed: Nov. 6, 2014

(86) PCT No.: PCT/FR2014/052847
§ 371 (c)(1),
(2) Date: May 4, 2016

(87) PCT Pub. No.: WO2015/067906
PCT Pub. Date: May 14, 2015

(65) Prior Publication Data
US 2016/0281605 A1    Sep. 29, 2016

(30) Foreign Application Priority Data

Nov. 7, 2013 (FR) .................................. 13 60904

(51) Int. Cl.
| | |
|---|---|
| *F02C 3/04* | (2006.01) |
| *F02C 7/20* | (2006.01) |
| *F02C 7/32* | (2006.01) |
| *F02C 7/36* | (2006.01) |
| *B64D 27/26* | (2006.01) |

(52) U.S. Cl.
CPC ................ *F02C 7/20* (2013.01); *B64D 27/26* (2013.01); *F02C 3/04* (2013.01); *F02C 7/32* (2013.01); *F02C 7/36* (2013.01); *B64D 2027/268* (2013.01); *F05D 2220/32* (2013.01)

(58) Field of Classification Search
CPC ... F02C 7/20; F02C 7/32; B64D 27/26; B64D 2027/268; F05D 2220/32
USPC .............................. 60/796, 797, 802; 244/54
See application file for complete search history.

(56) References Cited

U.S. PATENT DOCUMENTS

| | | | | |
|---|---|---|---|---|
| 5,452,575 | A * | 9/1995 | Freid | ...................... B64D 27/18 244/54 |
| 6,401,448 | B1 | 6/2002 | Manteiga et al. | |
| 2006/0248900 | A1* | 11/2006 | Suciu | ........................ F02C 7/32 60/802 |
| 2009/0175716 | A1 | 7/2009 | Vetters | |
| 2013/0160459 | A1* | 6/2013 | Thies | ........................ F02C 7/32 60/796 |

(Continued)

FOREIGN PATENT DOCUMENTS

| | | |
|---|---|---|
| EP | 1627812 | 2/2006 |
| EP | 2607658 | 6/2013 |

*Primary Examiner* — Richard A Edgar
(74) *Attorney, Agent, or Firm* — Womble Bond Dickinson (US) LLP

(57) ABSTRACT

Turbine engine, comprising two structural annular casings (16, 22) which are interconnected by connecting rods (54), characterized in that the turbine engine further has at least one accessory gearbox (40) which is fixed to a first of the casings (16) and which is connected by the connecting rods to the other of the casings (22).

14 Claims, 3 Drawing Sheets

(56) References Cited

U.S. PATENT DOCUMENTS

2014/0013769 A1\* 1/2014 Martin ................. F02C 7/20
  60/796
2015/0285153 A1\* 10/2015 Peltier ................. F02C 7/32
  74/15.8

\* cited by examiner

TURBINE ENGINE PROVIDED WITH MEANS FOR ABSORBING STRESSES FROM THE THRUST OF THE ENGINE THEREOF

TECHNICAL FIELD

The present invention relates to a turbine engine comprising two structural annular casings which are interconnected by means for absorbing thrust forces from the engine.

PRIOR ART

An aircraft turbine engine comprises, from upstream to downstream, in the direction of flow of the gases in the engine, an air intake, at least one compressor, a combustion chamber, at least one turbine and a pipe for ejecting combustion gases.

A bypass turbojet engine comprises in particular a low-pressure body having a first shaft connecting a low-pressure compressor to a low-pressure turbine, and a high-pressure body having a second shaft connecting a high-pressure compressor to a high-pressure turbine. The air entering the engine is compressed successively in the low-pressure compressor and the high-pressure compressor before being mixed with fuel which is burned in the combustion chamber. The combustion gases then expand in the high-pressure turbine and then in the low-pressure turbine in order to set into rotation the low-pressure shaft which in turn drives a fan shaft, the fan being mounted upstream of the compressors and generating the majority of the thrust of the turbojet engine.

The various modules of the turbine engine are surrounded by structural annular casings, i.e. casings which are stiff enough to transmit forces. Thus, a turbine engine can comprise in particular, from upstream to downstream, a fan casing, a low-pressure compressor casing, an intermediate casing which extends between the low-pressure and high-pressure compressors, high-pressure compressor, combustion chamber and high-pressure turbine casings, an inter-turbine casing which extends between the high-pressure and low-pressure turbines, a low-pressure turbine casing and an exhaust casing in the region of the pipe of the turbine engine.

In the current art, it is known to increase the bypass ratio of a bypass turbojet engine, i.e. the ratio of the rate of flow of the secondary flow generated by the fan to the rate of flow of the primary flow powering the engine. This reinforces the "wasp waist" effect of the turbine engine, the engine of which has a body (in particular in the region of the high-pressure compressor) which has a relatively small diameter by comparison with the fan casing.

The more pronounced the "wasp waist" of a turbine engine is, the more the body thereof is at risk of bending in operation. In order to remedy this problem, it is known to equip a turbine engine with means for absorbing the thrust forces from the engine, which means generally comprise longitudinal connecting rods, one end of which is articulated on the intermediate casing, and the opposite end of which is articulated on suspension means for suspending the turbine engine from an aircraft strut.

The role of the thrust-absorbing connecting rods is to limit the thrust loads passing through the casings of the engine, which makes it possible to prevent sensitive casings bending under loads, such as casings of the compressors and turbines, where good concentricity is indispensable in particular for minimising the clearances at the apex of the rotor blades and ensuring satisfactory performance. U.S. Pat. No. 6,401,448-B1, US.2009/175716-A1 and EP-1.627.812-A2 describe examples of engines comprising connecting rods of this type.

Furthermore, a turbine engine comprises an accessory gearbox (abbreviated to AGB) which makes it possible to drive equipment such as a lubrication unit. It has already been proposed to mount an accessory gearbox in the vicinity of the body of the engine rather than in the nacelle of the turbine engine. However, an accessory gearbox is relatively bulky and it is relatively complex to integrate it around the casings of the engine, in particular because there are already several accessories which are already installed in this region. EP-2.607.658-A2 describes a gas turbine engine assembly which is connected to a strut structure for mounting the engine, comprising a chassis supporting at least one accessory gearbox independently of the engine, and thrust-absorbing connecting rods which are independent of the accessory gearbox. The chassis is attached to the strut and to fastening points in front of and behind the engine.

The above-mentioned thrust-absorbing connecting rods pass through this region and make this integration difficult, because the accessory gearbox should be separated from the connecting rods by clearances which are sufficient to prevent any contact therebetween. The present invention in particular provides a simple, effective and economical solution to at least some of the problems of the prior art.

SUMMARY OF THE INVENTION

The invention proposes a turbine engine, comprising two structural annular casings which are interconnected by means for absorbing thrust forces from the engine which have connecting rods, characterised in that said means for absorbing thrust further have at least one accessory gearbox which is fixed to a first of said casings and which is connected by said connecting rods to the other of said casings.

According to the invention, the accessory gearbox or gearboxes is/are some of the means for absorbing thrust and thus are involved in absorbing the forces passing into the body of the engine during operation. The accessory gearbox or gearboxes thus ensure(s) at least one force pathway between the structural casings. The gearbox or gearboxes can be stiffer than those of the prior art in order to ensure this function. Furthermore, the connecting rods associated with the gearbox(es) can be shorter and have a smaller cross section than those of the prior art. Indeed, the use of the accessory gearbox as a means for absorbing thrust makes it possible to take advantage of the dimensions of said gearbox in order to shorten the length of the connecting rods and the diameter thereof. When there are identical loads, the more the length of the connecting rods increases, the more the diameter thereof also increases, and vice versa.

According to one embodiment of the invention, said at least one accessory gearbox is fixed to a hub of an intermediate casing.

Advantageously, the connecting rods can have a first end which is articulated on said at least one accessory gearbox and a second end which is connected directly or indirectly to an inter-turbine casing or to an exhaust casing. Each articulation can be a pivot joint or a ball joint. The second end of the connecting rods can be articulated on the inter-turbine casing or the exhaust casing.

In a variant, the second end of the connecting rods can be connected to the inter-turbine casing or to the exhaust casing by downstream suspension means of the turbine engine.

The second end of the connecting rods can be articulated on the suspension means which are mounted on said inter-turbine or exhaust casing.

Preferably, the suspension means comprise a support member which is designed to be fixed to an aircraft strut.

The means for absorbing thrust can comprise a single accessory gearbox which is generally V or U-shaped and which comprises two lateral arms which are interconnected by a middle portion, said middle portion being fixed to said first casing, and the arms each being connected by a connecting rod to the other casing. FR-12/58196 describes an accessory gearbox of this type. The arms contain lines of gears which are located in non-parallel planes and which are joined to one another by at least one gear unit located in the middle portion for joining the arms. The construction of the kinematic chain as a plurality of lines of gears located in non-parallel planes makes it possible to arrange the entirety of even a large accessory gearbox close to the body of the engine, without excessive bulk in the radial direction, in the axial direction or in the angular direction, the gearbox not being rectilinear. There is also a large number of faces of the accessory gearbox available, which faces extend in very different directions, for the placement of the equipment, and this also contributes to limiting the bulk of the assembly.

In a variant, the means for absorbing thrust comprise two independent accessory gearboxes which have an elongate shape, each accessory gearbox comprising a longitudinal end which is fixed to the first casing and an opposing longitudinal end which is connected by a connecting rod to the other casing.

The connecting rods can be substantially parallel to one another and to the longitudinal axis of the turbine engine. The connecting rods are thus arranged in a much more axial manner than in the prior art and therefore can absorb forces only in a single direction, which greatly limits the bending stresses on the connecting rods and makes it possible to reduce the diameter of said rods. Furthermore, in a suspension concept of the turbine engine in which it is the front suspension which would transmit the thrust forces to the aeroplane via the strut, the connecting rods which are fixed to the accessory gearbox would only have the role of preventing the bending of the sensitive casings.

Each connecting rod can comprise a first end articulated on a yoke which is rigidly connected to a casing of said at least one accessory gearbox, and a second end articulated on a yoke which is rigidly connected to a member which is mounted on said other casing. The member can be a ring which is mounted around said other casing and on which suspension means are mounted for suspending the turbine engine from an aircraft strut. In a variant, the member can be a member for supporting suspension means for suspending the turbine engine from an aircraft strut.

The present invention also relates to means for absorbing thrust for a turbine engine of the type described above, characterised in that they comprise at least one accessory gearbox having means for fixing to a casing and means for articulation on at least one connecting rod.

Said at least one accessory gearbox can be generally in the shape of a V or U, each lateral arm of which bears means for articulation on a connecting rod. In a variant, said at least one accessory gearbox has an elongate shape, a longitudinal end of which bears means for articulation on a connecting rod.

The present invention also relates to a use of at least one turbine engine accessory gearbox for absorbing thrust forces from the engine of said turbine engine.

The present invention lastly relates to a turbine engine accessory gearbox, comprising a casing bearing means for fixing to the turbine engine and means for connecting to connecting rods, characterised in that the casing of said gearbox is structural in order to ensure a transmission of force between the fixing means and the connecting means.

The accessory gearboxes of the prior art are not designed to ensure this transmission of force and the casings thereof are thus not structural. The structural casing of the accessory gearbox can have a machining allowance compared with those of the prior art, reinforcement ribs, a cross section made of material which is equivalent to that of the connecting rods, etc. A person skilled in the art is responsible for designing a structural casing for an accessory gearbox according to the forces and the types of force that it is capable of transmitting.

DESCRIPTION OF THE DRAWINGS

The invention will be better understood, and other details, features and advantages of the invention will become apparent upon reading the following description, given by way of non-limiting example and with reference to the accompanying drawings, in which.

DETAILED DESCRIPTION

Figure 1:
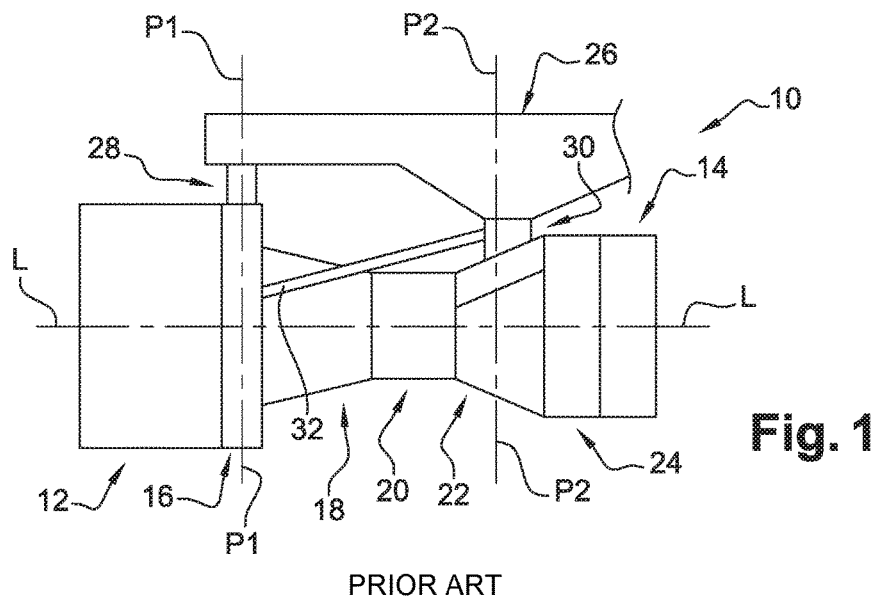
FIG. 1 is a schematic side view of an aircraft turbine engine according to the prior art.

Reference is made firstly to FIG. 1, which shows a turbine engine 10 according to the prior art, said turbine engine 10 in this case being a bypass turbojet engine.

The turbine engine 10 comprises, from upstream to downstream, in the direction of flow of the gases, a fan 12 which generates a flow which divides into two coaxial flows, the primary flow powering the engine which comprises a low-pressure compressor, a high-pressure compressor, a combustion chamber, a high-pressure turbine, a low-pressure turbine and a pipe 14 for ejecting combustion gases.

These modules of the engine (fan, compressors, combustion chamber, turbines) are surrounded by structural annular casings. The turbine engine 10 thus comprises a plurality of successive annular casings, including an intermediate casing 16, a high-pressure compressor casing 18, a combustion chamber casing 20, an inter-turbine casing 22 and an exhaust casing 24.

As shown in FIG. 1, in order to ensure the mounting and the fixing of the turbine engine 10 to an aircraft strut 26 under the wings thereof, two suspensions 28, 30 or suspension means, which are upstream and downstream respectively, are provided so as to form an interface between the turbine engine 10 and the strut 26. The upstream suspension 28 is arranged between the strut 26 and the intermediate casing 16, and the downstream suspension is arranged between the strut 26 and the inter-turbine casing 22.

The suspensions 28, 30 are arranged and contained in two suspension planes P1 and P2 of the turbine engine, which planes are parallel to one another and orthogonal to the longitudinal axis L-L of said turbine engine.

The turbine engine 10 from FIG. 1 further comprises means for absorbing the thrust forces from the engine, which means comprise in this case two longitudinal connecting rods 32, the upstream ends of which are articulated on the intermediate casing 16, and the downstream ends of which are articulated on the downstream suspension 30.

However, this technology has disadvantages including complex integration of at least one accessory gearbox of the AGB type (for driving equipment) in the region that extends around the engine and through which the thrust-absorbing connecting rods 32 pass.

The invention makes it possible to remedy these disadvantages by giving the accessory gearbox(es) an additional function of absorbing thrust forces, the accessory gearbox thus being an integral part of the means for absorbing thrust from the turbine engine.

Figure 2:
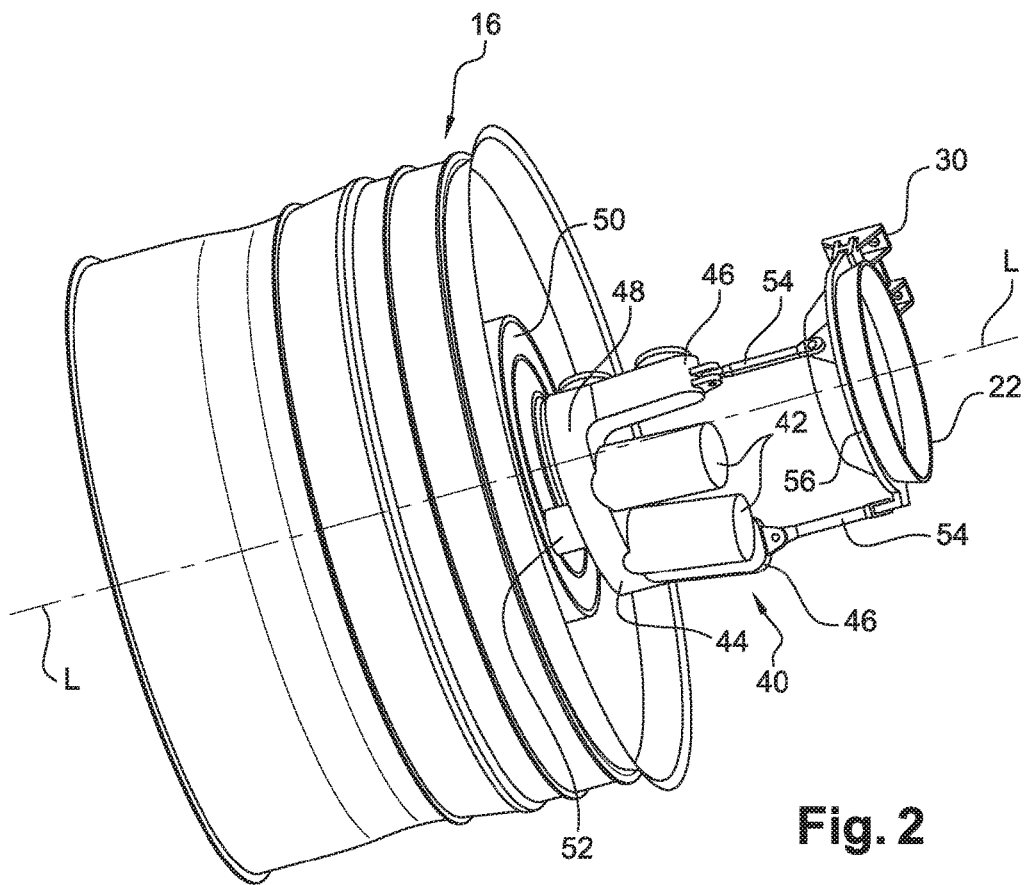
FIG. 2 is a partial schematic perspective view of a turbine engine according to the invention.
Figure 3:
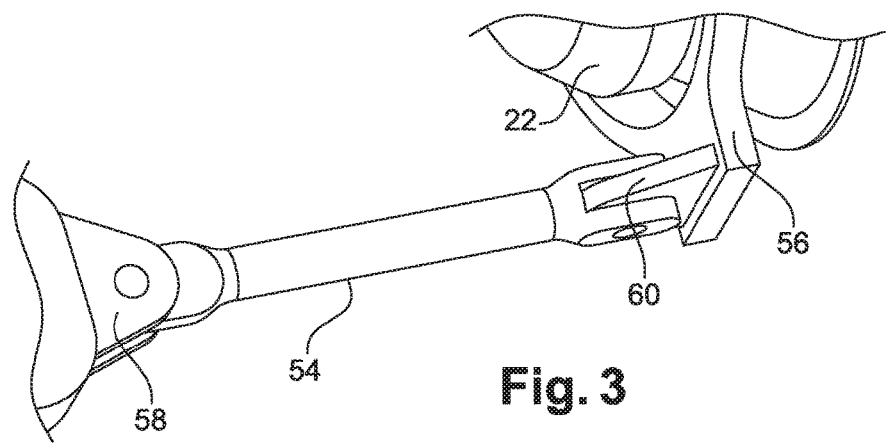
FIG. 3 is a larger-scale view of part of FIG. 2.
Figure 4:
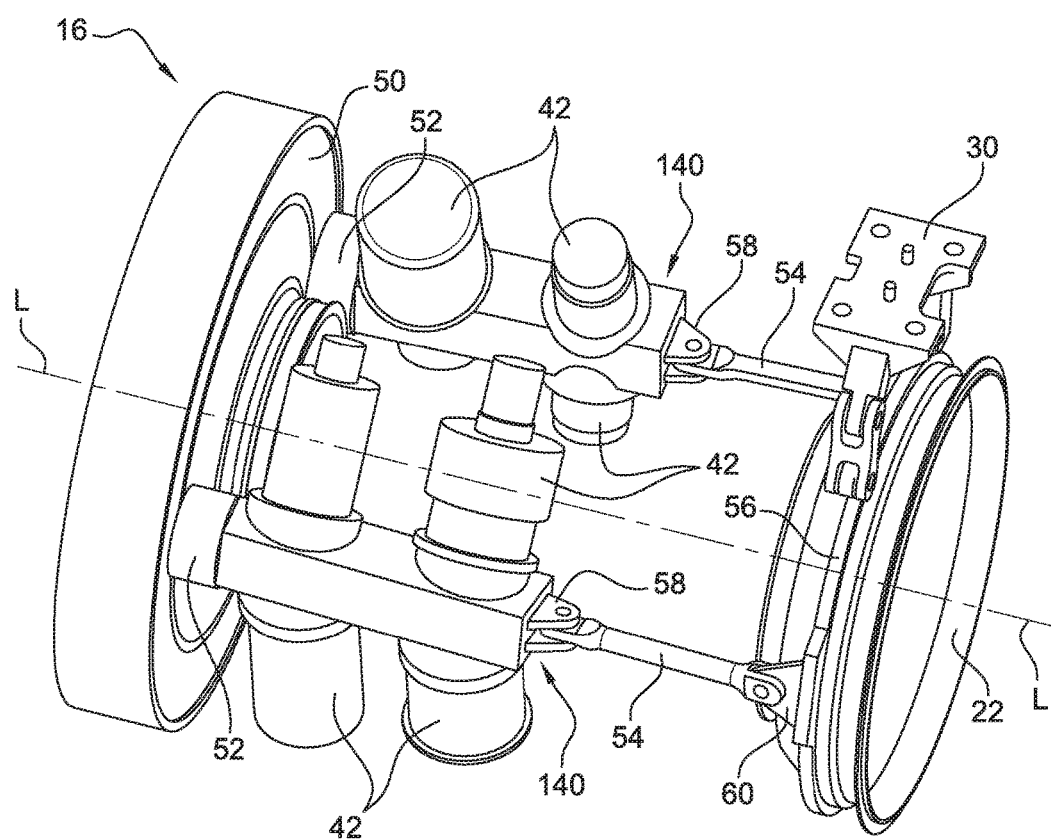
FIG. 4 is a partial schematic perspective view of a variant of the turbine engine according to the invention.

FIGS. 2 to 4 show two embodiments of the invention, the means for absorbing thrust from the first embodiment (FIGS. 2 and 3) comprising a single accessory gearbox 40 which is generally V or U-shaped, and the second embodiment (FIG. 4) comprising two independent accessory gearboxes 140 each having an elongate shape.

A V or U-shaped accessory gearbox 40 is described in FR-12/58196. The accessory gearbox 40 is intended to transmit mechanical power originating from the turbine engine by means of a radial shaft going out of said turbine engine, and to transmit said power to the equipment 42 that said gearbox bears, said equipment 42 being for example pumps, electricity generators, etc. The transmission is carried out by a kinematic chain which is formed of gears inside a casing 44. Said chain is connected to the radial shaft and to drive take-off shafts of the equipment 42 fixed to the casing 44 of the accessory gearbox 40.

The accessory gearbox 40 comprises two arms 46 which are interconnected at one of the ends thereof by a middle portion 48. The middle portion 48 is oriented upstream in such a way that the arms 46 extend downstream and are located in a symmetrical manner on either side of a plane passing through the longitudinal axis LL of the turbine engine.

In the example shown, the middle portion comprises a downstream face for mounting equipment 42, and the arms 46 each comprise a lateral face for mounting equipment 42.

The accessory gearbox 40 is mounted downstream of the intermediate casing 16 and is fixed thereto so as to extend around a portion of the high-pressure compressor casing (not shown in FIG. 2, but denoted by the reference sign 18 in FIG. 1). The intermediate casing 16 comprises a hub 50 which is surrounded by a cylindrical wall 52 and connected thereto by radial arms (not visible). The accessory gearbox 40 is fixed to the hub 50 of the intermediate casing 16, the middle portion 48 thereof comprising upstream means 52 for fixing to said hub 50.

Each arm 46 of the accessory gearbox 40 is connected by a thrust-absorbing connecting rod 54 to a ring 56 which is mounted around the inter-turbine casing 22. More specifically, each arm 46 comprises, at the downstream end thereof, a yoke 58 bearing a shaft for articulation of an upstream end of a connecting rod 54, the downstream end of which is articulated on a shaft borne by a yoke 60 which is rigidly connected to the ring 56 (FIG. 3).

As can be seen in FIG. 2, the connecting rods 54 are shorter than those 32 of the prior art and are substantially parallel to one another and to the longitudinal axis LL of the turbine engine. In the example shown, said connecting rods have a circular cross section. The shaft for articulation of the upstream end of each connecting rod 54 has a substantially tangential orientation with respect to a circumference which is centred on the longitudinal axis LL, and the shaft for articulation of the downstream end of each connecting rod 54 has a substantially radial orientation with respect to said axis LL.

As can be seen in FIG. 2, the downstream suspension 30 for suspending the turbine engine from the strut is fixed to the ring 56. In the example shown, the yokes 60 for articulation of the downstream ends of the connecting rods 54 are located in a region which is substantially diametrically opposed to the downstream suspension 30. The means for absorbing thrust which are formed by the accessory gearbox 40 and the connecting rods 54 are thus located in the lower portion of the engine, by contrast with the prior art.

The intermediate casing 16 is thus connected to the inter-turbine casing 22 by the accessory gearbox 40 and the connecting rods 54, which thus ensure a force pathway between the casings 16 and 22 and prevent the bending of the casings of the engine during operation.

Reference is now made to the variant in FIG. 4. There are two accessory gearboxes 140. Said gearboxes have an elongate shape and are substantially parallel to one another and to the longitudinal axis LL of the turbine engine. They are located at a circumferential distance from one another and are for example located at 3 and 9 o'clock respectively around the axis LL, using the analogy of a clock face.

Each gearbox 140 comprises lateral faces for mounting equipment 42. Each gearbox 140 is mounted downstream of the intermediate casing 16, around the high-pressure compressor casing, and the upstream end thereof comprises means 52 for fixing on the hub 50 of the intermediate casing 16.

Each accessory gearbox 140 is connected by a thrust-absorbing connecting rod 54 to a ring 56 which is mounted around the inter-turbine casing 22. More specifically, each gearbox 140 comprises, at the downstream end thereof, a yoke 58 bearing a shaft for articulation of an upstream end of a connecting rod 54, the downstream end of which is articulated on a shaft borne by a yoke 60 which is rigidly connected to the ring 56.

The connecting rods 54 are substantially parallel to one another and to the longitudinal axis LL. In the example shown, said connecting rods have a circular cross section. The articulation shafts of the connecting rods 54 are perpendicular to the direction of the connecting rods. The shaft for articulation of the upstream end of each connecting rod 54 has a substantially tangential orientation with respect to a circumference which is centred on the axis LL, and the shaft for articulation of the downstream end of each connecting rod 54 has a substantially radial orientation with respect to said axis LL.

The means for absorbing thrust which are formed by the accessory gearbox 140 and the connecting rods 54 are located on the sides of the engine, by contrast with the prior art.

Figure 5:
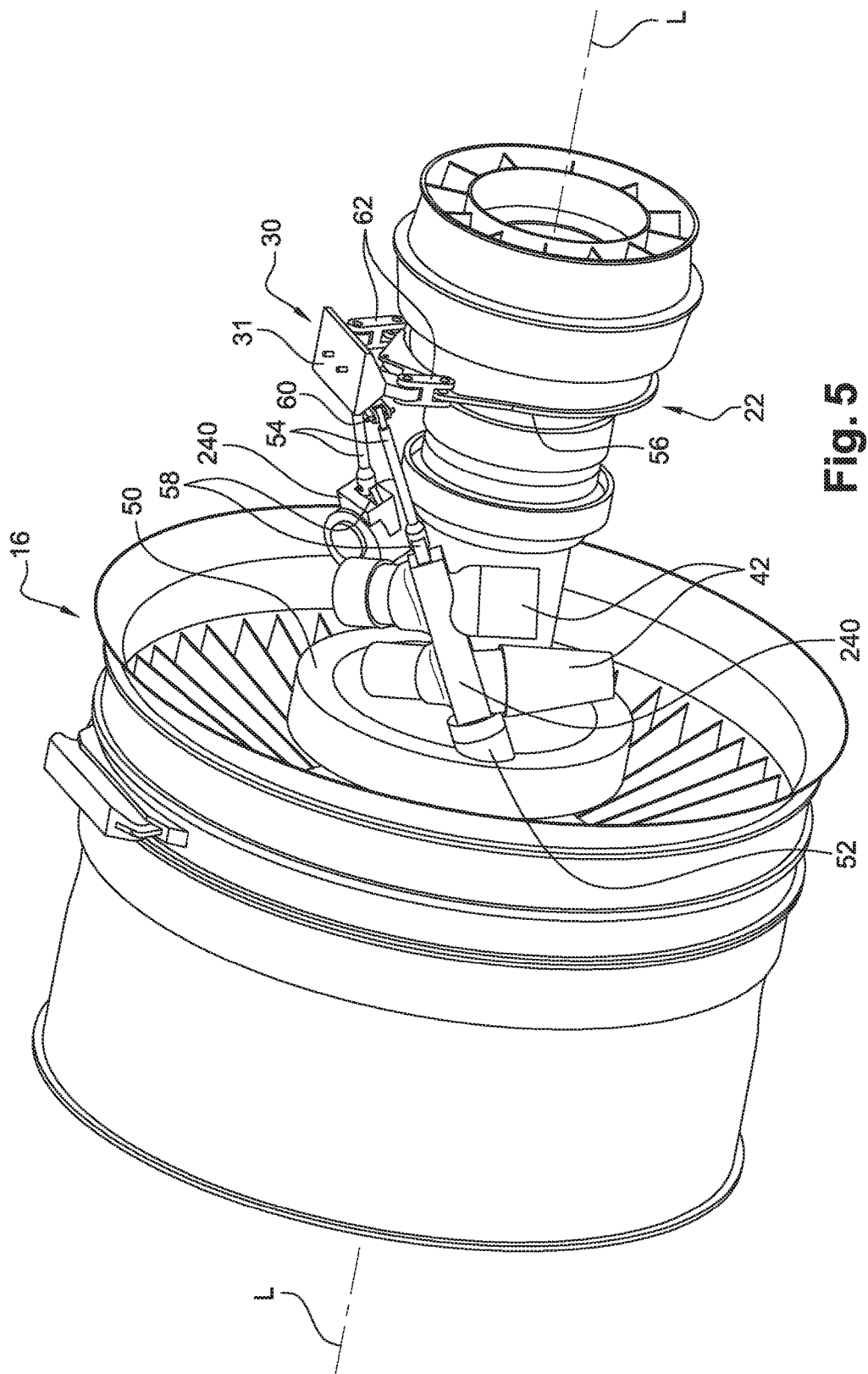
FIG. 5 is a partial schematic perspective view of another turbine engine according to the invention.

Reference is now made to FIG. 5, which shows another variant of the invention in which the elements already described above are denoted by the same reference signs.

The variant in FIG. 5 basically differs from that in FIGS. 2 and 3 as follows.

There are two accessory gearboxes 240. Said gearboxes have an elongate shape and are inclined with respect to one another and with respect to the longitudinal axis LL of the turbine engine. They are located at a circumferential distance from one another, and the upstream ends thereof are located for example at 3 o'clock and 9 o'clock respectively around the axis LL, using the analogy of a clock face.

Each gearbox 240 comprises lateral faces for mounting equipment 42. Each gearbox 240 is mounted downstream of the intermediate casing 16, around the high-pressure compressor casing, and the upstream end thereof comprises means 52 for fixing on the hub 50 of the intermediate casing 16.

Each accessory gearbox 240 is connected by a thrust-absorbing connecting rod 54 to a member 31 for supporting the rear suspension 30. Said support member is designed to be fixed to an aircraft strut and comprises, in the example shown, a plate comprising openings for mounting fixing means of the screw-and-nut type.

More specifically, each gearbox 240 comprises, at the downstream end thereof, a yoke 58 bearing a shaft for articulation of an upstream end of a connecting rod 54, the downstream end of which is articulated on a shaft 60 borne by a yoke which is rigidly connected to the member 31 or to the plate thereof.

The member 31 is connected by small connecting rods 62 to a ring 56 which is similar to that described above, said ring 56 being mounted around the inter-turbine casing 22 of the turbine engine.

The connecting rods 54 are inclined with respect to one another and with respect to the longitudinal axis LL. Said rods substantially form a V-shaped assembly, the gearboxes 240 extending longitudinally in the extension of the connecting rods 54. In the example shown, said connecting rods have a circular cross section.

The articulation shafts of the connecting rods 54 are perpendicular to the direction of the connecting rods.

The invention claimed is:

1. A turbine engine, comprising two structural annular casings which, considering the direction of flow of the gases in the engine from upstream to downstream, are axially located respectively upstream of a high pressure compressor and downstream of a high pressure turbine, and which are interconnected by means for absorbing thrust forces from the engine having connecting rods, wherein the means for absorbing thrust further have at least one accessory gearbox which is located outside said two structural casings, which extends between said two structural casings, which is directly fixed to a first casing and which is connected by the connecting rods to a second casing.

2. A turbine engine according to claim 1, wherein said the at least one accessory gearbox is fixed to a hub of an intermediate casing.

3. A turbine engine according to claim 1, wherein the connecting rods have a first end articulated on the at least one accessory gearbox and a second end which is connected directly or indirectly to an inter-turbine casing or to an exhaust casing.

4. A turbine engine according to claim 3, wherein the second end of the connecting rods is articulated on the inter-turbine casing or the exhaust casing.

5. A turbine engine according to claim 3, wherein the second end of the connecting rods is connected to the inter-turbine casing or to the exhaust casing by downstream suspension means of the turbine engine.

6. A turbine engine according to claim 5, wherein the second end of the connecting rods is articulated on the suspension means which are mounted on the inter-turbine or exhaust casing.

7. A turbine engine according to claim 5, wherein the suspension means comprise a support member which is designed to be fixed to an aircraft strut.

8. A turbine engine according to claim 1, wherein the means for absorbing thrust comprise a single accessory gearbox which is generally V or U-shaped and which comprises two lateral arms which are interconnected by a middle portion, the middle portion being fixed to the first casing, and the arms each being connected by a connecting rod to the second casing.

9. A turbine engine according to claim 1, wherein the means for absorbing thrust comprise two independent accessory gearboxes which have an elongate shape, each accessory gearbox comprising a longitudinal end which is fixed to the first casing and an opposing longitudinal end which is connected by a connecting rod to the second casing.

10. A turbine engine according to claim 1, wherein the connecting rods are substantially parallel to one another and to the longitudinal axis of the turbine engine.

11. A turbine engine according to claim 1, wherein each connecting rod comprises a first end articulated on a yoke which is rigidly connected to a casing of the at least one accessory gearbox, and a second end articulated on a yoke which is rigidly connected to a member which is mounted on the second casing.

12. A turbine engine according to claim 11, wherein the member is a ring which is mounted around the second casing and on which suspension means are fixed for suspending the turbine engine from an aircraft strut.

13. A turbine engine according to claim 11, wherein the member is a support member for suspension means for suspending the turbine engine from an aircraft strut.

14. A turbine engine accessory gearbox, comprising a casing bearing means for directly fixing to the turbine engine and means for connecting to connecting rods, wherein the casing is structural in order to ensure a transmission of force between the means for directly fixing to the turbine engine and the connecting means.

* * * * *